Patented Mar. 13, 1951

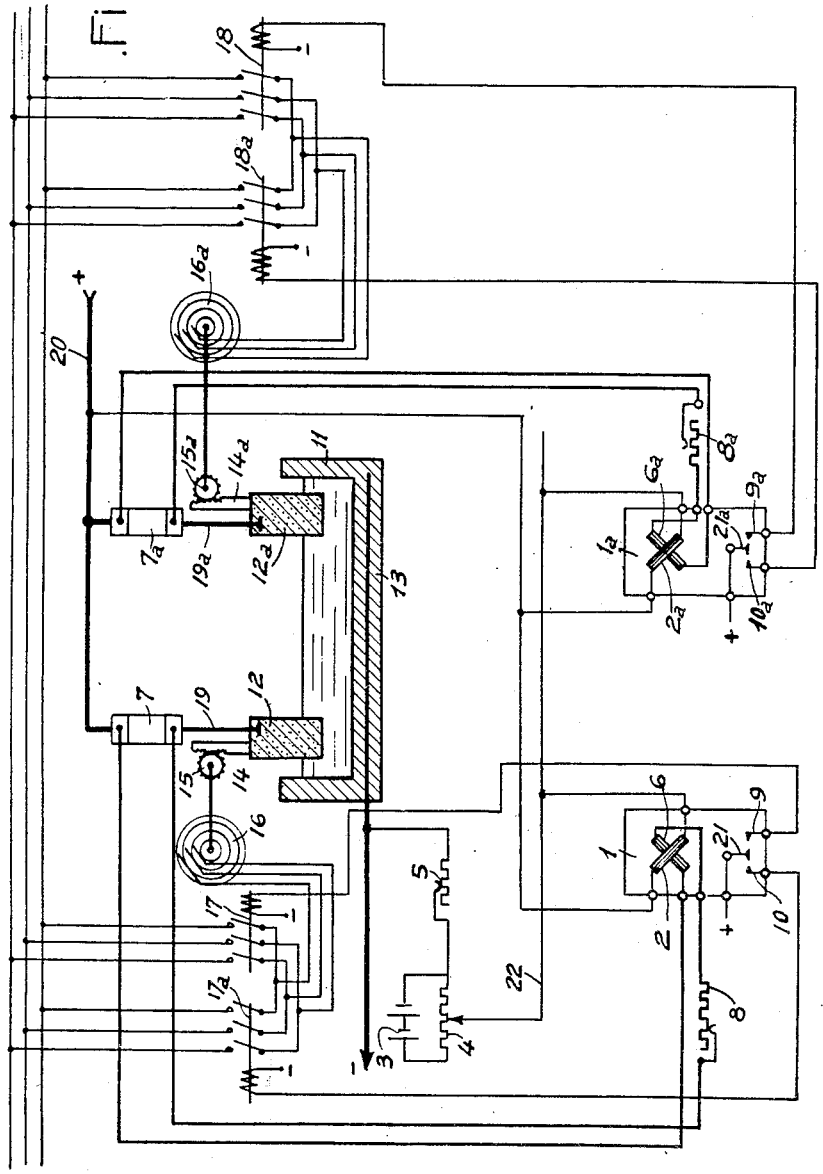

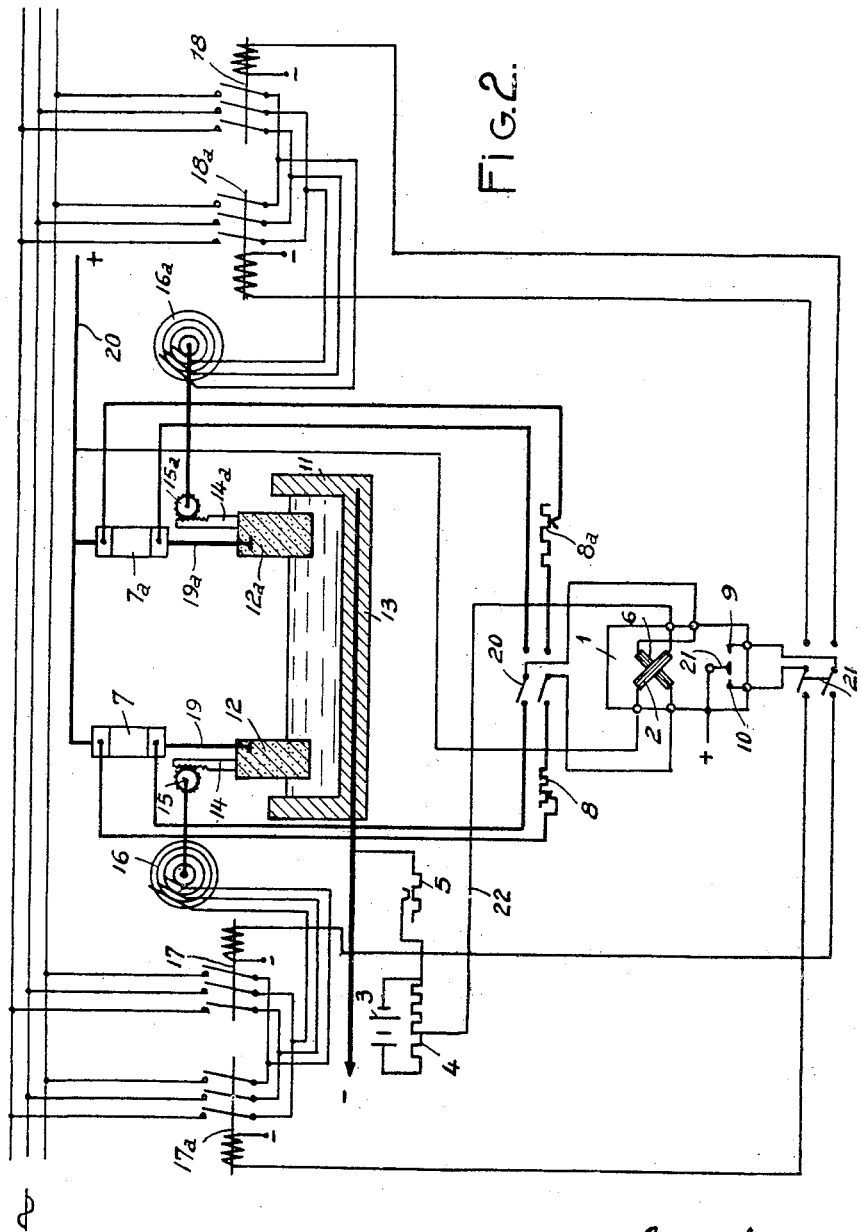

2,545,413

UNITED STATES PATENT OFFICE 2,545,413

APPARATUS FOR AUTOMATIC REGULATION OF ELECTROLYTIC CELLS

Roger Joseph Perret-Bit, Chambery, France, assignor to Compagnie de Produits Chimiques et Electrometallurgiques Alais, Froges et Camargue, Paris, France Application October 9, 1947, Serial No. 778,966
In France October 29, 1946

3 Claims. (Cl. 204—225)

The present invention relates to electrolytic cells with multiple electrodes. Its object is to provide a method providing an automatic and full regulation of such cells, that is providing automatic adjustment of the interpolar spacing between electrodes of opposite polarity (anode and cathode) so that the resistance of the cell should have a desired predetermined value and that the current should be suitably distributed among the electrodes of similar polarity.

It is known that in certain types of cells the anode-cathode resistance varies as a result of the electrolytic operation of the cell. It is well known, in particular that the electrolytic cells used in the manufacture of aluminum are provided with vertically-movable carbon anodes cooperating with a cathode formed by the bottom wall of the cell upon which the metal is adapted to settle. Such anodes are gradually burnt by the oxygen evolved at the points of contact therewith. The spacing between the anodes and the cathodes is therefore variable.

According to the invention, automatic regulation for such cells is obtained by using a regulator adapted to measure the resistance value of each cell element formed by each electrode and the corresponding portion of the electrolyte bath in the tank. In practice use is made of a resistance regulator the voltage circuit of which is supplied with voltage across the terminals of the cell and the current circuit of which is supplied under a voltage proportional to the current flowing through each electrode, this being effected either through the use of a shunt mounted on each electrode, or on a portion of the supply conductor or else by any other known means for measuring the direct current intensity.

Such resistance regulator will comprise contacts adapted to act in either one or two directions upon the motor controlling the upward or downward movement of each electrode, in the required direction. In this way if each portion of the cell element formed by an electrode and the corresponding bath at each instant presents a resistance value equal to the predetermined desired one, the current distribution between the electrodes of the tank will at all times be equal to that which it is desired to obtain. This is so because the current in each electrode is equal to the voltage across the tank terminals divided by the combined resistance of the electrode under consideration and of the portion of the bath following the latter; if such combined resistance is the same for all of the electrodes, since the voltage is also the same, the current distribution will be uniform.

Similarly the inverse overall resistance of the tank being obviously equal to the combined inverse resistances of each portion including one electrode and its corresponding bath, as each of said portions has a resistance value which is held constant by the regulator forming the subject of the present application, the inverse overall resistance of the tank will also be constant and equal to the predetermined given value.

In the accompanying drawings—

Figure 1 is a diagram of an arrangement according to the invention including a regulator for each individual electrode;

Fig. 2 is a diagram of another arrangement according to the invention which embodies a common regulator for all of the tank electrodes.

In the drawings, reference numeral 11 designates the electrolytic cell and 12 and 12a are units comprising anodic electrodes movable in relation to the bottom 13 of the cell which constitutes the cathode; each electrode has attached to it a power lead 19 which is attached to a main power lead 20. Also, each electrode is rigid with one of bars 14 and 14a formed with a set of rack-teeth meshing with pinions 15 and 15a. Said pinions are respectively rotated from adjusting means such as motors 16 and 16a the direction of rotation of which may be reversed. In the example shown said motors 16 and 16a are asynchronous three-phase motors respectively supplied by way of switch contact means 17 and 17a and 18 and 18a making it possible for each motor to rotate in either one of both directions of rotation.

The resistance regulators such as balanced relays 1 and 1a are shown as indicating instruments with crossed inductance members 2 and 6 or ratiometers.

One of the movable frames 2 is supplied with the voltage drop present across the terminals of the cell through the medium of a means 22 connected across the cell and supplying a desired constant voltage, which should be necessarily made adjustable so as to take into account the variations in electromotive force of the cell. In the arrangement shown, such means 22 comprises a set of storage batteries 3 supplying a potentiometer 4. Moreover an adjustable resistor 5 makes it possible to alter at will the predetermined operative voltage value.

The other movable frame 6 is supplied in the embodiments illustrated, from a means such as a shunt 7 inserted in the circuit of each electrode, through the medium of a resistance 8 which also makes it possible to adjust the predetermined operative value.

The switch contacts or connections 9 and 10 and a member 21 actuated by the inductance members in each regulator are used to complete either a signalling circuit indicating the displacements with respect to the predetermined value, or to actuate circuits insuring the desired automatic adjustments. In this latter case, which applies in the arrangements illustrated, operation is as follows:

Whenever the resistance value of the elementary cell formed by an electrode, say the electrode of unit 12, and the corresponding portion of the tank bath exceeds the predetermined value of the setting of the relay 1, one of the connections, say the connection 9, will be closed causing closure of the switch 17 through energisation of the coil thereof, and this results in starting the motor 16 in the direction required for lowering the electrode of the unit 12. Conversely if the resistance value falls below the setting value, the connection 10 will be closed, energising the coil of the switch 17a and causing the latter to be closed, thereby starting the motor 16 in a direction to raise the electrode.

Operation is identical for the other electrode in the tank.

The form of embodiment shown in Fig. 2 differs from the above described embodiment in that a single balanced relay is used. This relay is identical to either of the relays described in connection with Fig. 1. Its inductance member 2 is similarly supplied by the voltage drop across the tank terminals. Its inductance member 6 is alternately connected to the shunt 7 of each electrode power lead through the medium of a switch 20.

The connections 9 and 10 are in turn connected to a switch 21 adapted to alternately connect said connections with the switches 17 and 17a of the driving motor 16 for the electrode 12 and the switches 18 and 18a for the motor 16a. Both switches 20 and 21 are coupled together so as to connect the circuits for measuring and actuating the balanced relay 1 alternately with each electrode drive motor.

It will of course be understood that the present invention, is in no way restricted to the illustrative embodiments described and represented and that it may be embodied in various modified forms.

What I claim is:

1. An electrolytic apparatus having at least one cell for containing an electrolyte and having a plurality of units each comprising two electrodes immersed in said electrolyte, adjusting means for moving one of said electrodes toward and away from the other electrode, power leads attached to said electrodes for connection through main leads with a direct-current source, a balanced relay in each unit having two inductance members whose electromagnetic fields are in opposition and a member actuated by said inductance members, said actuated member moving between a connection for causing the adjusting means to move the said one electrode away from the other electrode and a connection for causing said adjusting means to move the said one electrode toward the other electrode, means coupled with the power lead of one of said electrodes for impressing on one of said inductance members a voltage proportional to the current flowing through said electrode, and means including a constant-voltage device connected across the main leads for impressing on the other of said inductance members a voltage proportional to the difference between the voltage across all the cells and the back electromotive force of all the cells.

2. An electrolytic apparatus as recited in claim 1, wherein: the means connected across the main leads is common to at least two of the units.

3. An electrolytic cell as recited in claim 1, wherein: the inductance members and the actuated member are common to all of the units and are connected through switch means to control any one of the units separately and selectively.

ROGER JOSEPH PERRET-BIT.

REFERENCES CITED

The following references are of record in the file of this patent:

UNITED STATES PATENTS

| Number | Name | Date |
| --- | --- | --- |
| 1,396,919 | Brace | Nov. 15, 1921 |
| 1,547,984 | Weber | July 28, 1925 |
| 2,026,466 | Grolee | Dec. 31, 1935 |

FOREIGN PATENTS

| Number | Country | Date |
| --- | --- | --- |
| 9,071 | Great Britain | June 22, 1895 |